May 6, 1969  G. A. RÖDER  3,442,499
COOLED CUTTING TORCH CARRIAGE
Filed Sept. 20, 1966

United States Patent Office 3,442,499
Patented May 6, 1969

3,442,499
COOLED CUTTING TORCH CARRIAGE
Georg Adam Röder, Frankfurt am Main-Fechenheim, Germany, assignor to Messer Griesheim G.m.b.H., Frankfurt am Main, Germany, a corporation of Germany
Filed Sept. 20, 1966, Ser. No. 580,768
Claims priority, application Germany, Sept. 24, 1965, M 66,749, M 66,755
Int. Cl. B23k 37/02
U.S. Cl. 266—23                                                                             10 Claims

ABSTRACT OF THE DISCLOSURE

A cutting torch carriage has a hollow interior which is essentially closed against free movement of air. The interior is cooled by cooling structure having heat-absorbing elements and a circulation system connected to recirculate the air in the interior in a closed path in contact with the heat-absorbing elements.

---

The present invention relates to cutting torch carriages such as those used with cutting machines to cut metal plates with oxyacetylene burners or the like, into desired shapes.

Carriages of the above type are exposed to considerable heat, particularly at those locations adjacent the torches. It is not desirable to permit uncontrolled heating of the carriage in this way, and such heating also makes it awkward for an operator to control the cutting operation. Prior arrangements, however, have not been too successful in solving the difficulty.

Among the objects of the present invention is the provision of improved cutting torch carriages which greatly reduce or completely eliminate the foregoing difficulty.

These as well as additional objects of the present invention will be more fully appreciated from the following description of several of its exemplifications, reference being made to the accompanying drawings wherein.

Figure 1:
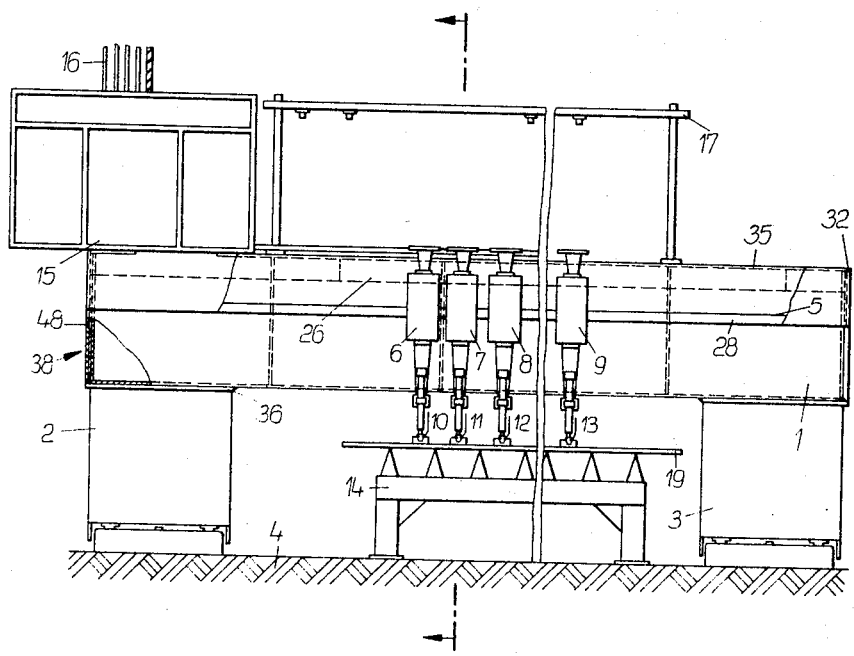
FIG. 1 is a front elevation of a cutting torch machine having a carriage typical of the present invention, some interior portions of the carriage being also indicated by dash lines.

According to the present invention a cutting torch carriage has generally hollow interior portions essentially closed against free movement of air to or from the exterior, cooling structure held by the carriage with heat-absorbing elements exposed to the closed off interior portions, and a circulation system connected to recirculate the air in said portions in a closed path in contact with the heat-absorbing elements. The generally hollow internal portions preferably extend along essentially the entire carriage surface adjacent the cutting torch locations so as to provide good cooling there.

The cooling structure can be contained within the carriage although this is not essential, and if desired the cooling structure can be externally secured to a convenient location on the carriage. One end of the carriage is generally the most suited for holding the cooling structure whether it be inside or external of the carriage. It is particularly helpful to provide circulation for the cooling structure through a duct connected to guide the freshly cooled air to a remote section of the hollow carriage interior. The cooled air can then be permitted to recirculate back through the hollow portions and thus effect the desired carriage cooling. For best results a blower is used to move the freshly cooled air into the duct and thus provide positive circulation. However, circulation can be effected by merely relying on convection currents alone, as by locating the heat-absorbing elements of the cooling structure at a relatively high location with ample space below them for the cooled air to descend and move toward the warm locations of the carriage where this air will be heated and rise to be returned to the cooling structure.

A very effective carriage construction has its interior separated into hollow sections by partition sheets that stiffen the carriage and include passageways through which the recirculating air can be moved sufficiently freely between the hollow sections.

According to a further aspect of the present invention the controls for the carriage, that is the controls that adjust the flow of oxygen and acetylene as well as direct the carriage's traversing action and movements of the torches themselves, are mounted within the carriage and are exposed to the air recirculating through at least one of the generally hollow interior portions. These controls are preferably mounted on drawer-type supports that can be retracted from the interior of the carriage, outer panels on the supports being desirably arranged to seat against the outside of the carriage to close off the openings through which the supports retract. Air seals, such as yieldable gasketing or the like, can be further arranged to seal the engagement sites between these panels and the carriage walls to reduce leakage.

The entire air recirculation within the carriage in accordance with the persent invention is arranged so that there is no large leakage of the recirculating air to the atmosphere around the carriage, nor is there any large movement of air the other way. While it is helpful to have the carriage's interior completely airtight, and thus assure that no dust or the like works its way inside, this is not at all essential. No special seals are therefore needed for internal wiring or gas conduits or the like. During cutting operations the air in the interior will tend to develop a pressure somewhat higher than atmospheric so that the air leakage will take place from the interior to the exterior, thus minimizing the entrance of dust. After the cutting operation is completed, the cooling can be terminated and if at that time there is any movement of air from the outside to the interior of the carriage, it is very gradual and takes place at a time when not much dust is being stirred up around the carriage.

Turning now to the drawings, the carriage is shown at 1 in FIG. 1 as having a body 53 mounted on two pedestals 2 and 3 by which it is supported for traversing along rails which may be anchored in the floor 4. The carriage itself also carries a rail 5 more clearly illustrated in FIG. 2, which extends transversely of the rails on which the carriage moves. Four torch holders 6, 7, 8 and 9, are shown in FIG. 1 as fitted on carriage 1 for a slidable travel along the rail 5. Each holder 6, 7, 8 and 9 carries a cutting torch 10, 11, 12, 13 respectively, which operates on a workpiece such as plate 19 held on a work table 14. A connection box 15 is shown as held on the upper portion of one end of the carriage for receiving and distributing oxygen and acetylene lines 16 as well as electrical conduits for the carriage and its torches and torch holders. A stop frame 17 is also illustrated on the carriage 1 for limiting its transverse movement and also limiting the movement of the torch holders.

The carriage body 53 is generally shaped like a hollow rectangular prism formed by welded-together metal plates so that there is an open interior 18. Stiffening partition plates 20, 21 and 22 are also welded in place so that space 18 is divided into individual compartment portions such as 24, 25, 26 and 27.

Relatively ample openings 30 through 33 are provided in partitions 20, 21 to allow sufficiently free air travel between compartments 24, 25 and 27. A smaller opening 34 in partition 22 provides access to compartment 27. Compartment 27 is located at one end 43 of the carriage body 53, the other compartments being located adjacent to the cutting torch locations where the undesired heat is generated. The end of the carriage is most remote from the source of heat so that it is generally the coolest. Compartment 27 is shown as provided with a grille-like opening 28 by which it communicates freely with the external atmosphere. The remaining compartments 24, 25, 26 can all make a substantially airtight combination.

A heat pump or refrigerator 35 is installed in compartment 27 with its condenser 36 or similar heat-yielding structure in good heat-exchange contact with the atmosphere in compartment 27. By means of the grille openings 28 the condenser is also in good heat-exchange relation with the atmosphere outside the carriage. The evaporator of the refrigerator is located on the opposite side 37 of the refrigerator alongside partition 22, and a blower 38 is shown as extending into compartment 26 adjacent the evaporator. The blower has a suction inlet 34 exposed to the interior of compartment from which it sucks air and moves it through a passageway 39 to be cooled by the evaporator and then blown into a duct 29. This duct leads the freshly cooled air into the farthest compartment 24 from which it returns in the passageways provided by the partitions, through compartment 25 and back into compartment 26. A thermal switch 41 may also be mounted adjacent the intake of blower 38 and connected so that it automatically switches on the cooling when the air in compartment 26 reaches a predetermined temperature such as 40° C. This switch may be arranged independently of the blower 38 and the blower operated at all times when cutting is being performed. There will then be some cooling effected by the recirculation alone and when this is inadequate the refrigerator will be brought into action.

A blower may also be provided for operation with condenser 36 to improve its heat exchange with the surrounding air, if desired.

Figure 2:
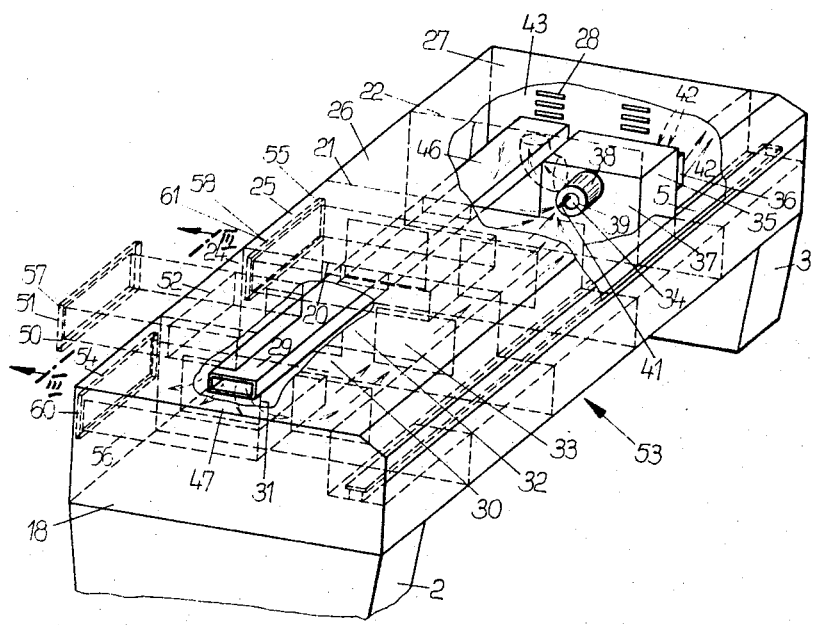
FIG. 2 is an isometric view of the carriage of FIG. 1 with some internal structure shown in dash lines and with parts broken away to better show other internal structure.
Figure 3:
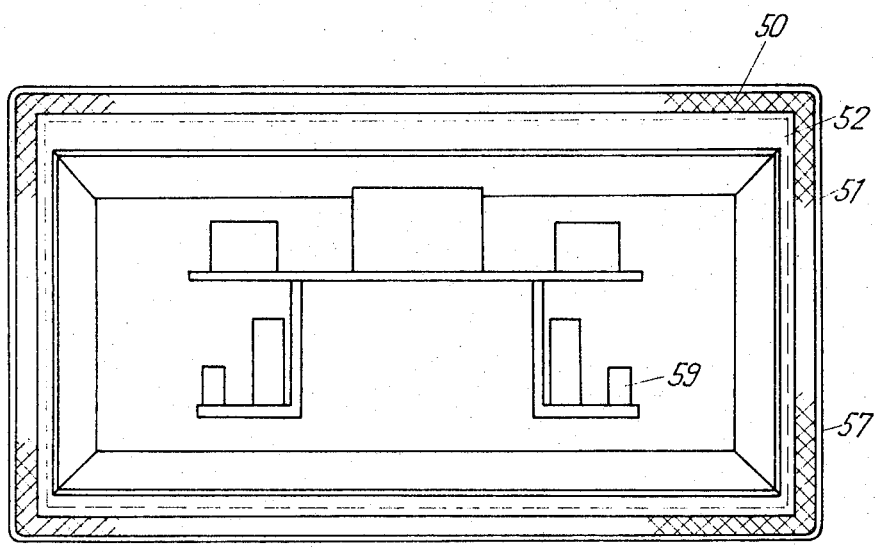
FIG. 3 is a vertical sectional view taken along the line III—III of FIG. 2.

FIGS. 2 and 3 also show drawer-type retractable supports 56, 57 and 58 each fitted through openings 52, 54, 55 respectively on the side of the carriage body 53. Support 57 is shown as partially retracted from the carriage, the other two being shown fully seated in place. Each of the drawer-like supports is conveniently mounted on drawer rails or the like and carries a set of controls 59 for one of the cutting torches and its holder. The supports can also be simple frameworks without tops, bottoms, sides or inner ends so that the controls they carry are more fully exposed to the cooling effect of the air circulating in the cooled compartments.

The outer ends of the drawer-type supports are provided with facing panels 51 each a little larger than its carriage opening through which the support is inserted. In this way the complete insertion of the individual drawer supports will cause their facing panels 51 to close the respective openings so that the interior of the carriage is substantially completely enclosed. The drawer openings can be made more airtight by fitting the respective front panels with marginal sealing strips 50, 60, 61 of resilient material, for example of asbestos or rubber, that are held on the panel face and engage the carriage surface. High temperature sponge rubber, such as silicone rubber, is particularly suitable for this purpose.

It is advantageous to arrange the drawer-type supports so that each is placed in a separate one of the partitioned compartments within the carriage. Also the passageways in the partitions can be arranged so that they extend vertically a distance high enough to permit both cool and warm air to move between compartments. By placing duct 29 at a relatively high level in the top of the carriage the cooled air will be more effectively distributed. The control supports 56, 57, 58 can also be located at a level below the duct and thus get more benefit of the cooling. The general movement of the cooled air is indicated by arrows 47. Duct 29 can, if desired, be further provided with side outlets that directly discharge some of the freshly cooled air in the intermediate compartments 25 and 26.

The number of individual hollow cooling compartments can be varied from one to ten or more. Generally the longer carriages require more mechanical stiffening and the partitions that form the compartments are excellent stiffeners.

Obviously many modifications and variations of the present invention are possible in the light of the above teachings. It is, therefore, to be understood that the invention may be practiced otherwise than as specifically described.

What is claimed:

1. A cutting torch carriage, in combination therewith, cutting torch means on said carriage for cutting a work piece with the aid of heat, said carriage having generally closed off hollow interior portions essentially closed off against free movement of air to or from the exterior, cooling means for cooling said interior while permitting the work piece to be heated by said cutting torch means, said cooling means including cooling structure held by the carriage with heat-absorbing elements exposed to the closed off interior portions, and a circulation system connected to recirculate the air in said portions in a closed path in contact with the heat-absorbing elements.

2. The combination of claim 1 in which the generally hollow interior portions extend along essentially the entire carriage surface adjacent the cutting torch locations.

3. The combination of claim 1 in which the entire cooling structure is contained within the carriage.

4. The combination of claim 3 in which the cooling structure is at one end of the carriage.

5. A cutting torch carriage having generally hollow interior portions essentially closed against free movement of air to or from the exterior, cooling structure held by the carriage with heat-absorbing elements exposed to the closed off interior portions, a circulations system connected to recirculate the air in said portions in a closed path in contact with the heat-absorbing elements, and the circulation system including a duct connected to guide air from the heat absorbing elements to a remote section of the hollow interior.

6. The combination of claim 5 in which the circulation system includes a blower connected to move the air from the heat-absorbing elements into the duct.

7. A cutting torch carriage having generally hollow interior portions essentially closed against free movement of air to or from the exterior, cooling structure held by the carriage with heat-absorbing elements exposed to the closed off interior portions, a circulation system connected to recirculate the air in said portions in a closed path in contact with the heat-absorbing elements, and the hollow interior portions being separated from each other by partition sheets that permit circulation between said portions.

8. The combination of claim 1 in which carriage controls are mounted within and exposed to the air recirculating through at least one of the generally hollow interior portions.

9. The combination of claim 8 in which the controls are mounted on drawer-type supports that can be retracted from the interior of the carriage, the supports having outer panels that seat against the outside of the carriage to close off the openings through which the supports retract.

10. The combination of claim 8 in which the controls are mounted on drawer-type supports that can be retracted from the interior of the carriage, the supports having outer panels that when fully inserted essentially close the openings through which the supports retract, and air seals seal the engagement sites between the panels and the carriage wall to reduce air leakage.

References Cited

UNITED STATES PATENTS

| 2,606,754 | 8/1952 | Tyrner. | |
|---|---|---|---|
| 3,033,440 | 5/1962 | Ruppright | 62—259 |
| 3,078,560 | 2/1963 | Vosburg | 62—259 |

JOHN J. CAMBY, *Primary Examiner.*

U.S. Cl. X.R.

62—259